Patented July 26, 1949

2,477,018

UNITED STATES PATENT OFFICE 2,477,018

SYNTHETIC RUBBERY COPOLYMERS OF NORMAL OLEFINS WITH DIOLEFINS

Robert M. Thomas, Baton Rouge, La., and Harold C. Reynolds, Belmont, Mass., assignors to Standard Oil Development Company, a corporation of Delaware No Drawing. Application December 30, 1944, Serial No. 570,750

10 Claims. (Cl. 260—93)

This invention relates to polymerization process; relates particularly to the polymerization of normal, or linear, olefins; and relates especially to the polymerization and copolymerization of normal, linear olefins with polyolefins, by the application thereto at low temperatures of a new catalyst and polymerization procedure.

The olefins generally are known to be reactive for various polymerization reactions, by which materials of increased molecular weights are obtained. The isoolefins polymerize into materials of very high molecular weight, particu'arly isobutylene, which is readily polymerized by a low temperature technique using a Friedel-Crafts type catalyst, into polymeric substances having molecular weights ranging from 1,000 to 500,000 or even higher. The normal or linear olefins are, however, much more resistant to polymerization, and to the present, the only polymers of such substances as propylene, the normal butylenes, the normal amylenes and the like have been dimer and trimer, although, experimentally, it has been found possible to produce polymers containing from 5 to 7 or 8 or 9 or 10 molecules of the original olefin, in the form of oily substances, with molecular weights from 210 to 420. These normal olefins are, however, so resistant to polymerization that it has been, to the present, impossible to polymerize them into polymers having molecular weights as high as 1,000. The high resistance to polymerization of the normal olefins is well shown by the fact that ethylene is habitually utilized as inert diluent-refrigerants in the polymerization reaction as applied to isobutylene, and it neither participates in the polymerization reaction nor shows any perceptible poisoning effect upon the polymerization of isobutylene, showing that the polymerization conditions for the linear olefins must be wholly different from the polymerization condition of the isoolefins, if high molecular weight polymers are to be obtained.

This characteristic of the various olefins appears to be dependent in part upon the fact that the catalysts previously available have been of relatively low catalyzing power. The unique characteristic of boron trifluoride has been the maintenance of its catalyzing power at very low temperatures, by virtue of its gaseous character. Nevertheless, in low concentrations it is of low catalyzing power in effecting the polymerization of difficultly polymerizab!e olefins. Most of the other catalysts are useless at low temperatures either because they solidify into an inert solid mass, or are insoluble in the reactants at any temperature.

The present invention thus produces a new type of polymer by the application, to the linear olefins, of a new catalyst under new catalyzing conditions.

Specifically, this catalyst is a strong solution of aluminum chloride or other Friedel-Crafts type catalyst, that is, a metal or metalloid halide, in high concentration solution in a low freezing, non-complex forming solvent. This high concentration catalyst solution is then used in relatively very large proportion with the normal olefin or with a mixture of normal olefin and diolefin, cooled to low temperatures and results in a very powerful catalyzing effect, which causes the product'on of high molecular weight polymers at low temperatures from substances which otherwise polymerize only with the greatest difficulty, and do not polymerize to high molecular weight polymers at all with ordinary catalysts.

This high concentration catalyst solution is also effective for the copolymerization of the normal olefins with polyolefins such as butadiene, isoprene, piperylene, dimethyl butadiene, dimethallyl, myrcene, and the like, substantially all of the polyolefins having from 4 to 12 or 14 carbon atoms per molecule being useful for the copolymerization process. For the normal olefins, propylene, normal butylene, and normal amylene are particularly useful. Higher normal olefins up to 8 or 10 carbon atoms are also useful under certain conditions.

Thus an object of the invention is to copolymerize the normal olefins with polyolefins, in a ratio of between 1:3 and 3:100 volumes of polyolefins per volume of normal olefin, to high molecular weight polymers above 1,000 by the application thereto at a low temperature of a relatively large proportion, greater than 25 per cent of the olefin to be polymerized, of a solution of Friedel-Crafts type or active halide catalyst substance in a low freezing solvent in a proportion greater than 2%, the polymerization temperature being below −10° C.

In practicing the invention a substantially saturated solution of the Friedel-Crafts type catalyst such as aluminum chloride, aluminum bromide, aluminum iodide, titanium chloride, uranium chloride, boron trifluoride, zirconium tetrachloride, and the like, as disclosed by N. O. Calloway in his article on "The Friedel Crafts Synthesis," printed in the issue of "Chemical Review," published for the American Chemical Society at Baltimore in 1935 in volume XVII, No. 3, the article beginning on page 327, the list being particularly well shown on page 375, is dissolved in a low freezing, non-complex forming solvent such as methyl or ethyl chloride, carbon disulfide, propyl chloride in its various forms, chloroform, ethylene dichloride, vinyl chloride, and the like, in a concentration greater than approximately 1% or 2%, up to saturation, the solution being prepared at temperatures ranging from those well below the boiling point of the solvent to room temperature or above, depending upon the solvent and the solubility of the particular Friedel-Crafts type substance. The solvent should have a freezing point below 0° C., thereby being "low freezing," and should boil away from the Friedel-Crafts metal halide at a temperature within a degree or two of the normal boiling point of the pure solvent. (If propyl chloride is used, it must be handled with care as it decomposes rapidly at room temperature when treated with $AlCl_3$. It must be employed with cooling to, say, 0° C. during the preparation and storage of catalyst solution.)

Simultaneously, the olefin to be polymerized is cooled to a temperature ranging from +10° C. to −100° C. or lower, preferably to −50° C. or lower, and is treated with the polymerization catalyst, the amount of catalyst utilized being from about 25 parts of the strong solution per 100 parts of the olefinic material, to about 150 parts of catalyst solution per 100 parts of olefinic material; the preferred proportion being about equal parts of catalyst solution to olefinic material. The mono-olefin used may be any of the normal olefins including propylene, butene-1, butene-2, the various amylenes, both the normal amylenes and the polymerization resistant iso amylenes, the various hexylenes. These may be admixed with various of the diolefins, and various of the substituted olefins such as methallyl chloride, the nitro-olefins, the alkyl benzenes which contain unsaturated linkages in the side chains, unsaturated naphthene hydrocarbons and the like. The olefin mixture may be cooled by the use of a diluent-refrigerant such as liquid ethane or liquid methane or liquid propane or liquid butane or solid carbon dioxide, or other of the various known low boiling substances which are inert under the conditions employed for reaction. If solid carbon dioxide is used, it is desirably present in excess sufficient to keep the entire reaction liquid cooled to its normal volatilization temperature of approximately −78° C. In the event that the various liquid diluent refrigerants are used, the preferred range is from 50 parts of diluent-refrigerant per 100 parts of olefinic mixture to 500 parts of diluent-refrigerant per 100 parts of olefin depending upon the temperature desired and the olefin being polymerized, since there must be sufficient diluent-refrigerant present to absorb at least a major portion of the heat of polymerization of the olefinic substance.

This reaction and catalyst composition is presented as a general one applicable with all of the acid acting Friedel-Crafts type catalyst substances in combination with solvents which are liquid at temperatures at least as low as 0° C.; which will hold at least 1% of their weight of the Friedel-Crafts type catalyst in solution at that temperature, and which do not form an insoluble or readily solidifiable complex with the Friedel-Crafts type substance. These solvents appear to have a temperature-percentage solubility characteristic which is relatively low, or they readily form supersaturated solutions, or form colloidal solutions of the catalyst solid upon cooling, since when they are prepared at temperatures ranging from the boiling point of the solvent to room temperature or above, as saturated solutions, a major portion up to substantially all of the dissolved solid is held in the solution for substantial periods of time at temperatures ranging from about −10° C. to −100° C. or lower. The exact character of these solutions is not known. They may be true solutions having low temperature characteristics; they may be supersaturated solutions, or they may be colloidal dispersions at the low temperatures. In any case we do not wish to be bound by any theory or hypothesis as to the exact nature of these mixtures but only set forth these possibilities as possible explanations of their chemical nature.

EXAMPLE 1

A catalyst solution was prepared by dissolving 4 parts of aluminum chloride in 100 parts of ethyl chloride at a temperature of 12° C., the solution being readily accomplished by shaking the solid and liquid together. Equal parts of this solution and liquid propylene were mixed in a flask in the presence of solid carbon dioxide at a temperature of −78° C. After an interval of about five minutes, the polymerization reaction set in. This reaction was allowed to continue for an interval of approximately thirty minutes, at the end of which time the reaction was quenched by the addition of an excess of isopropyl alcohol. Approximately 65% of the propylene was found to have polymerized into a solid plastic polymer having a relatively high molecular weight of approximately 2,000 to 4,000.

The effect of the concentration of catalyst in the solution is very marked. A solution of 0.4 parts of aluminum chloride was prepared in 100 parts of ethyl chloride and equal parts of this solution and liquid propylene were mixed in the presence of solid carbon dioxide. Even after prolonged standing, no reaction occurred, indicating that the catalyst concentration is critical for this polymerization reaction, and that the critical value lies somewhere between 0.4 part of aluminum chloride per 100 of solvent and 4 parts of aluminum chloride per 100 parts of solvent. The exact point at which the critical value occurs has not as yet been determined, and it is believed to vary with the polymerization temperature, the proportion of olefin to catalyst solution and the character of the olefin.

This reaction as demonstrated in Example 1 appears to be unique to this particular character of catalyst. Propylene is wholly non-reactive in the presence of conventional catalytic amounts of boron trifluoride at temperatures lower than those at which propylene boils and it is inert to the extent that it can be used as a diluent or even as a diluent-refrigerant in the standard procedure for the polymerization of isobutylene. Thus a mixture of liquid isobutylene, with liquid propylene as a diluent, may be prepared and polymerized with gaseous boron fluoride at the temperature of about −50° C. set by the boiling point of the liquid propylene. The isobutylene polymerizes normally to yield a high molecular weight polymer and neither the reaction nor the polymer is influenced in any way by the presence of the liquid propylene, showing that as far as gaseous boron trifluoride is concerned, the propylene is non-reactive.

EXAMPLE 2

A catalyst solution consisting of 6 parts of aluminum chloride in 100 parts of ethyl chloride was prepared at 12° C. and cooled quickly to —103° C. in liquid ethylene. Simultaneously, a mixture of 100 parts of 2-pentene and 3 parts (by volume) of isoprene was prepared with 300 parts of liquid ethylene, and the two mixed. The polymerization began within a very few minutes, and in the course of thirty-five minutes, nearly all of the 2-pentene and the isoprene copolymerized into a solid polymer. The reaction was then quenched as before with isopropyl alcohol and a solid polymer having a weight equal to 77% of the pentene-isoprene mixture used was recovered. This polymer in common with other low temperature polymers was found to be a plastic, elastic substance of somewhat rubbery character, comparable in many ways to polyisobutylene as prepared by low temperature polymerization technique, although definitely of more resinous nature.

It may be noted that the catalyst used in this instance contained approximately 6% of aluminum chloride in solution, and that a major portion of this amount of aluminum chloride was retained in the solution, even when cooled to —103° C. by liquid ethylene.

EXAMPLE 3

A mixture of catalyst prepared as in Examples 1 and 2 was prepared with mixed olefin and diolefin substances, in the proportion of one part of butadiene, three parts of propylene and four parts of the catalyst solution in the presence of an excess of solid carbon dioxide. In this instance also the propylene polymerized, and interpolymerized with the butadiene to yield a similar polymer having a similar molecular weight, but a definitely higher iodine number, showing the presence of interpolymerized butadiene.

EXAMPLE 4

A similar mixture was prepared using amylene in place of the propylene of Example 3, and a similar polymerization reaction was found to occur to yield a similar polymer also with a higher iodine number, showing the presence of substantial proportions of interpolymerized butadiene.

The resulting copolymers can be chlorinated by the application of chlorine to the polymer while dissolved in a solvent such as carbon tetrachloride, and the reaction proceeds in a manner closely similar to that with polyisobutylene. Similarly, the copolymers are reactive with sulfur monochloride at elevated temperatures. The copolymers either per se, or when chlorinated or combined with sulfur monochloride, are readily soluble in hydrocarbon liquids generally, and in such solutions have many valuable properties such as the capability of increasing the viscosity of gasoline boiling range hydrocarbons, and increasing the viscosity and viscosity index of lubricants when present in proportions ranging from 0.5% to 10%.

Similarly, the copolymers are reactive with elementary sulfur, especially in the presence of a sulfurization aid such as Tuads (tetra methyl thiuram disulfide); or with such curing agents as paraquinone dioxime and its homologues and analogues, especially in the presence of an inorganic oxidation agent $Pb_3O_4$; or with dinitroso compounds such as dinitroso benzine or dinitroso cymene or the like.

A suitable compounding formula for the copolymer is—

Recipe 1

| | | |
|---|---|---|
| Polymer | parts by weight | 100 |
| Zinc Oxide | parts | 1 to 10 |
| Stearic Acid | do | 1 to 10 |
| Carbon Black | do | 10 to 200 |
| Tuads | do | 1 to 5 |

This compound may conveniently be prepared on the open roll mill, the polymer being milled until it is warmed up and plastic, the compounding substance being thereafter mixed into the polymer on the mill.

The resulting compound may then be heat treated at temperatures from 275° F. to 350° F. for time intervals ranging from 5 minutes to 180 minutes, according to the temperature and the curing agent used.

Similarly, the copolymers either per se, or chlorinated or sulfur chloride treated, are valuable addition agents for paints, varnishes, and lacquers as flexibilizers, tougheners and diluents.

Thus the invention herein above disclosed consists in the polymerization of the more resistant olefins by the application thereto at low temperature of a catalyst solution having a concentration above the critical value below which polymerization does not occur; for the production of polymers previously unknown and impossible of production; which polymers are of relatively high molecular weight, ranging from about 1,000 up to several thousand in magnitude and are useful in the arts as described above.

This application is a continuation-in-part of application Serial No. 372,194, now U. S. Patent 2,387,784, filed December 28, 1940, in which the process for polymerizing a normal olefin is claimed. Application Serial No. 570,216, now abandoned, filed December 28, 1944, relates to the same subject matter and claims normal olefin solid polymers obtained by the process.

The invention claimed is:

1. The process of copolymerizing a major proportion of a normal olefin having 3 to 6, inclusive, carbon atoms per molecule with a minor proportion of a polyolefin having 4 to 10 carbon atoms per molecule, comprising the steps of dissolving a Friedel-Crafts type catalyst in an alkyl halide having less than 4 carbon atoms per molecule to form a catalyst solution having a concentration of 1% to saturation of the catalyst, cooling the catalyst solution, the normal olefin, and the ployolefin to a temperature below —10° C., admixing 1 part by volume of the cooled catalyst solution with 0.05 to 4 parts by volume of a cold mixture of the normal olefin and the polyolefin, and cocatalyst solution, the normal olefin, and the polyolefin into a solid copolymer, said copolymerizing being effected in the aforementioned proportion of catalyst solution and the aforementioned concentration of catalyst in the catalyst solution.

2. The process as described in claim 1, in which the polyolefin is butadiene.

3. The process as described in claim 1, in which the normal olefin is propylene and the polyolefin is butadiene.

4. The process as described in claim 1, in which the normal olefin is normal amylene and the polyolefin is butadiene.

5. The process as described in claim 1, in which the normal olefin is normal butylene and the polyolefin is butadiene.

6. A solid rubbery copolymer of a major proportion of normal olefin having 3 to 6, inclusive carbon atoms per molecule and a minor proportion of a polyolefin having 4 to 10 carbon atoms per molecule.

7. A solid rubbery, sulfur-vulcanizable copolymer of propylene and of a minor proportion of butadiene.

8. A solid rubbery copolymer of a major proportion of normal butylene and of a minor proportion of butadiene.

9. A solid rubbery copolymer of a major proportion of amylene and of a minor proportion of butadiene.

10. The process described in claim 1, wherein the normal olefin is propylene, the polyolefin is a conjugated butadiene hydrocarbon having 4 to 6 carbon atoms per molecule, and the volume ratio of said butadiene hydrocarbon to propylene is between 1:3 and 3:100.

ROBERT M. THOMAS.
HAROLD C. REYNOLDS.

REFERENCES CITED

The following references are of record in the file of this patent:

UNITED STATES PATENTS

| Number | Name | Date |
|---|---|---|
| Re. 22,210 | DeSimo | Oct. 27, 1942 |
| 1,972,232 | Michel | Sept. 4, 1934 |
| 2,023,495 | Thomas | Dec. 10, 1935 |
| 2,092,295 | Van Peski | Sept. 7, 1937 |
| 2,142,980 | Huijser | Jan. 3, 1939 |
| 2,213,423 | Wiezevich | Sept. 3, 1940 |
| 2,276,893 | Thomas et al. | Mar. 17, 1942 |
| 2,356,127 | Thomas et al. | Aug. 22, 1944 |
| 2,356,128 | Thomas et al. | Aug. 22, 1944 |
| 2,405,950 | Hanford | Aug. 20, 1946 |

FOREIGN PATENTS

| Number | Country | Date |
|---|---|---|
| 278,486 | Germany | May 24, 1913 |
| 367,738 | Italy | Feb. 2, 1939 |